United States Patent [19]

Bi

[11] Patent Number: 5,345,468
[45] Date of Patent: Sep. 6, 1994

[54] DESPREADING TECHNIQUE FOR CDMA SYSTEMS

[75] Inventor: Qi Bi, Morris Plains, N.J.

[73] Assignee: AT&T Bell Laboratories, Murray Hill, N.J.

[21] Appl. No.: 991,841

[22] Filed: Dec. 16, 1992

[51] Int. Cl.$^5$ .............................................. H04K 1/00
[52] U.S. Cl. ...................................................... 375/1
[58] Field of Search ...................... 375/1, 96; 370/18; 455/38.1

[56] References Cited

U.S. PATENT DOCUMENTS

| | | | |
|---|---|---|---|
| 4,885,757 | 12/1989 | Provence | 375/96 |
| 4,995,104 | 2/1991 | Gitlin | 370/18 |
| 5,031,173 | 7/1991 | Short et al. | 370/18 |
| 5,099,493 | 3/1992 | Zeger et al. | 375/1 |
| 5,136,612 | 8/1992 | Bi | 375/1 |
| 5,151,919 | 9/1992 | Dent | 375/1 |
| 5,170,412 | 12/1992 | Massey | 375/1 |
| 5,177,766 | 1/1993 | Holland et al. | 375/1 |
| 5,218,619 | 6/1993 | Dent | 375/1 |
| 5,237,586 | 8/1993 | Bottomley | 375/1 |
| 5,295,153 | 3/1994 | Gudmundson | 375/1 |

OTHER PUBLICATIONS

U.S. Patent Application Ser. No. 07/982,168, filed on Nov. 24, 1992, entitled Data Recovery Technique for Asynchronous CDMA Systems (Q. Bi Case 3).
R. Lupas and S. Verdu, "Near-Far Resistance of Multi-user Detectors in Asynchronous Channels," *IEEE Transactions on Communications*, vol. 38, No. 4, Apr. 1990, pp. 496–507.

Primary Examiner—Salvatore Cangialosi
Attorney, Agent, or Firm—David R. Padnes

[57] ABSTRACT

Despreading of the received signal in a CDMA system is provided using code coefficient sequences which are derived from those utilized by the system users to encode their respective symbols. Each derived code coefficient sequence is a function of the correlation between a different user's code coefficient sequence and the code coefficient sequences of all other users. Advantageously, this technique substantially reduces interference effects and is suitable for use in the despreader of differentially or nondifferentially coded CDMA systems.

16 Claims, 5 Drawing Sheets

DESPREADING TECHNIQUE FOR CDMA SYSTEMS

TECHNICAL FIELD

The present invention pertains to recovering transmitted data in the receiver of a Code Division Multiple Access (CDMA) system and, more particularly, to such a system wherein the symbols of each user are recovered by despreading a received signal which is a composite of all users' symbols.

BACKGROUND OF THE INVENTION

CDMA is a signal modulation technique used in a variety of applications, such as cellular and wireless communications systems. In such systems, multiple users communicate at will with a base station over a common frequency band, with each user transmitting a uniquely coded signal. Consequently, the received signal at the base station is a composite of many differently coded signals.

At each user's transmitter, that user's coded signal is formed using a sequence of code coefficients in either of two ways. In nondifferentially encoded CDMA systems, each user's symbol is multiplied by a sequence of code coefficients. In differentially coded systems, instead of multiplying each user symbol by a code sequence, the difference between certain symbols and preceding symbols is multiplied by the sequence of code coefficients. In either arrangement, the multiplication process is known as spreading since the signal spectrum of the coded output symbols extends across a wider frequency range than that of the uncoded user symbols. At the receiver, each user's encoded digital symbols are recovered from the incoming composite signal using a signal despreader. In the despreader, each user's symbols are recovered by multiplying the incoming composite signal with an associated one of a plurality of different code coefficient sequences. In the prior art, the code sequence associated with each user is a replica of the code sequence used to encode that user's symbols.

It has long been recognized that during transmission a substantial amount of interference can be introduced into each coded signal from the other coded signals and compensation for this interference must be provided for intelligible communications. To reduce this interference, a number of different interference reduction techniques have been devised. In one prior art technique, apparatus is used in the receiver which operates on each user's symbols outputted by a despreader using priorly recovered other users' symbols. See, for example, U.S. Pat. No. 5,136,612, issued Aug. 4, 1992 and entitled "Method and Apparatus for Reducing Effects of Multiple Access Interference in a Radio Receiver in a Code Division Multiple Access Communications System". Another class of prior art systems uses an approach which operates on the received composite signal over a time interval using blocks of code coefficients wherein each block includes the code coefficients of each user corresponding to this time interval. See, for example, a publication entitled "Near-Far Resistance of Multiuser Detectors in Asynchronous Channels", *I.E.E.E. Transactions on Communications*, Vol. 38, No. 4, April 1990, and, more recently, a pending patent application entitled Data Recovery Technique for Asynchronous CDMA Systems, Ser. No. 982,168, filed on Nov. 24, 1992, and assigned to the present assignee. The potential shortcoming with all of these prior art arrangements is that they require the addition of interference canceller circuitry in the receiver and thus incur the cost of implementing such circuitry. In addition, they are not readily suitable for improving the performance capabilities of existing CDMA systems on a retrofit basis.

It would, therefore, be desirable if a low-cost, data recovery technique could be developed for CDMA systems which can be readily added to existing systems.

SUMMARY OF THE INVENTION

Broadly, the shortcomings of the prior art CDMA data recovery techniques are overcome, in accordance with the present invention, by despreading the received signal using code coefficient sequences which are different from those utilized by the users to generate their respective coded signals. More particularly, a coded user signal is transmitted for each of a plurality of users by processing that user's symbol by an associated sequence of code coefficients. Accordingly, the received signal is a composite of all coded user signals. In the receiver, each coded user signal is recovered using a different derived code coefficient sequence. Each derived code coefficient sequence is a function of the correlation of the code coefficient sequence associated with one of the system users and those code coefficient sequences associated with the other system users. Advantageously, this technique substantially reduces interference-induced decoding errors and is suitable for use in the despreader in either differentially or nondifferentially coded CDMA systems.

In the disclosed embodiments, each derived code coefficient sequence is formed by multiplying the code coefficients in an associated sequence by weighting factors.

DETAILED DESCRIPTION

The present invention will be described in reference to an illustrative CDMA system in which the chip streams of n users, where n is a predetermined integer greater than 1, arrive at a base station. As is well-known, each user transmits coded symbols, at will, to the base station. At each user's transmitter, each user's chip stream is generated by multiplying each symbol by a sequence of code coefficients or spreading code which includes a plurality of code coefficients. As a result, if there are m code coefficients in each sequence, where m is a predetermined integer greater than 1, there are m chips transmitted for each symbol. Each symbol is one of a plurality of discrete user-supplied signal amplitude values and each symbol is representative of a bit or a plurality of such bits. Typically, each coefficient in a spreading code is either −1 or +1 and is generated using a pseudorandom generator. It should be noted that the spreading code is both unique for each user and varies from symbol interval to symbol interval for any user.

At the base station receiver, the incoming signal includes a composite of all user chip streams. These chip streams are typically delayed relative to one another due to the asynchronous nature of the communications between any user and the base station. To recover each user's symbols, each user's chip stream must be extracted from the received signal. This is accomplished by a signal despreader which, in the prior art, multiplies the received signal during a symbol interval by a replica of each user's sequence of code coefficients for that interval. Pursuant to the present invention, it has been recognized that in CDMA systems of the type described above, white Gaussian noise is negligible compared to the interference in each user's chip stream introduced by other user chip streams. It is further recognized that the interference in any user chip stream in any symbol interval is a function of the correlation between that user's sequence of code coefficients and the sequences of code coefficients for all other users for that symbol interval. The present invention utilizes this principle by the utilization of a signal despreader which multiplies the received signal in a symbol interval by a sequence of code coefficients for each user which is an alteration of a replica of that user's code coefficient sequence in the symbol interval. The alteration is a function of the above-recited correlation. Therefore, the alteration is user-specific, i.e., it varies from user to user and, in addition, since the correlation varies from symbol interval to symbol interval, it follows that the alteration for any user also varies from symbol interval to symbol interval.

The code coefficients within each sequence in a symbol interval will now be discussed. At the outset, it will be noted that the code coefficients for the $i^{th}$ user, where $1 \leq i \leq n$, forms a sequence of code coefficients $c_i$ in a symbol interval which can be written as:

$$c_i = (c_{i1}, c_{i2}, \ldots, c_{im})^T, \tag{1}$$

where the superscript T represents the transpose of a vector and the second subscript of each code coefficient in the sequence $c_i$ represents the position of that coefficient in the sequence of m coefficients.

The composite of all n vectors $\hat{c}_i$ can be expressed as an m by n matrix C, where $$C = (c_1, c_2, \ldots, c_n), \tag{2}$$

and the matrix C contains the code coefficients for all users in one symbol interval.

Each vector $c_i$ can be expanded into an m by m diagonal matrix $\hat{C}_i$ which can be expressed as $$\hat{C}_i = \text{diag}(c_{i1}, c_{i2}, \ldots, c_{im}), \tag{3}$$

where the term diag represents the diagonal of the matrix and such diagonal includes the m values of the vector $c_i$ respectively distributed across the diagonal positions from left to right. The other matrix positions of $\hat{C}_i$ have zero values.

The received signal in each symbol interval, whether analog or digital, can be represented by a vector y having a predetermined number of vector components. For purposes of simplicity, we shall assume that the number of components of vector y is m and that m is a number of samples which satisfies the Nyquist theorem. Accordingly, the vector y can be expressed as $$y = (y_1, y_2, \ldots, y_m)^T. \tag{4}$$

In the prior art, the operation of a despreader can be expressed as being mathematically equivalent to $y^T C$ where the superscript T indicates the transpose of a vector.

In such prior art systems, the interference is related to a vector R', which in an n user CDMA system forming m chips per symbol interval, has n×1 dimensions and can be expressed as $$R'_i = C^T c_i, \tag{5}$$

or, in other words, $$R'_i = C^T c_i, \text{ or, in other words,} \tag{5}$$

$$R'_i = \begin{bmatrix} \sum_{L=1}^{m} (c_{1L})(c_{iL}) \\ \sum_{L=1}^{m} (c_{2L})(c_{iL}) \\ \vdots \\ \sum_{L=1}^{m} (c_{nL})(c_{iL}) \end{bmatrix}, \tag{6}$$

where L is a temporary variable in a summation.

Examining equation (6), the n components of vector $R'_i$ represent a cross-correlation of the code coefficient sequence for the $i^{th}$ user in any symbol interval and the code coefficients of all other users in this same interval.

Now, equation (5) can be written as $$R_i = C^T \hat{C}_i w_i, \text{ or} \tag{7}$$

$$R_i = \begin{bmatrix} \sum_{L=1}^{m} (C_{1L})(c_{iL})(w_{iL}) \\ \sum_{L=1}^{m} (C_{2L})(c_{iL})(w_{iL}) \\ \vdots \\ \sum_{L=1}^{m} (C_{nL})(c_{iL})(w_{iL}) \end{bmatrix}. \tag{8}$$

That is, the vector $R_i$ can be expressed as the above-mentioned cross-correlation times a weighting vector $w_i$. The weighting vector $w_i$ can be expressed as $$w_i = (w_{i1}, w_{i2}, \ldots, w_{im})^T, \tag{9}$$

where $w_i$ is an m times 1 vector and the superscript T is the transpose of this vector. In equation (6), this weighting vector is a unity or all ones vector. From equation (8), it should be noted that the elements of $R_i$, i.e., the interference from other users, can be reduced if one can find the appropriate nonzero values of $w_i$ such that each of the n terms of $R_i$ is reduced compared to its unweighted counterpart in equation (6).

It can be shown that minimizing the n terms of $R_i$ can be expressed by either one of the following objective functions $$J = R_i^T R_i - \alpha_i \sum_{L=1}^{m} w_{iL}, \text{ or} \quad (10)$$

$$J = R_i^T R_i - \alpha_i \sum_{L=1}^{m} w_{iL}^2, \quad (11)$$

where $\alpha_i$ is a scaling factor and $0 \leq \alpha_i \leq 1$. If we attempt to minimize J in either equation (10) or (11), we will minimize the interference in any recovered user's chip stream. Indeed, the $R_i^T R_i$ term represents this interference. Moreover, a minimization of J in either of these equations will respectively maximize the term $$\sum_{L=1}^{m} w_{iL} \text{ or } \sum_{L=1}^{m} w_{iL}^2.$$

A maximization of either of these sums represents a selection of $w_i$ values which will reduce the received signal energy as little as possible.

The objective functions governed by equations (10) and (11) differ only in the constraints on the permissible nonzero value of each component of the vector $w_i$. In equation (10), $0 \leq w_{iL} \leq 1$ and in equation (11) $-1 \leq w_{iL} \leq 1$.

Once the appropriate weighting vector $w_i$ is found, then the interference will be reduced in the despreader if this apparatus operates with code coefficient sequences expressible as $$c'_i = \hat{C}_i w_i. \quad (12)$$

As will be discussed, the objective functions expressed by equations (10) and (11) are utilized by the disclosed embodiments of the present invention and, once a minimum value of J is found, the corresponding nonzero values of $w_i$ are used to generate the altered code sequence $c'_i$ expressed by equation (12) for each of the n users.

Figure 1:
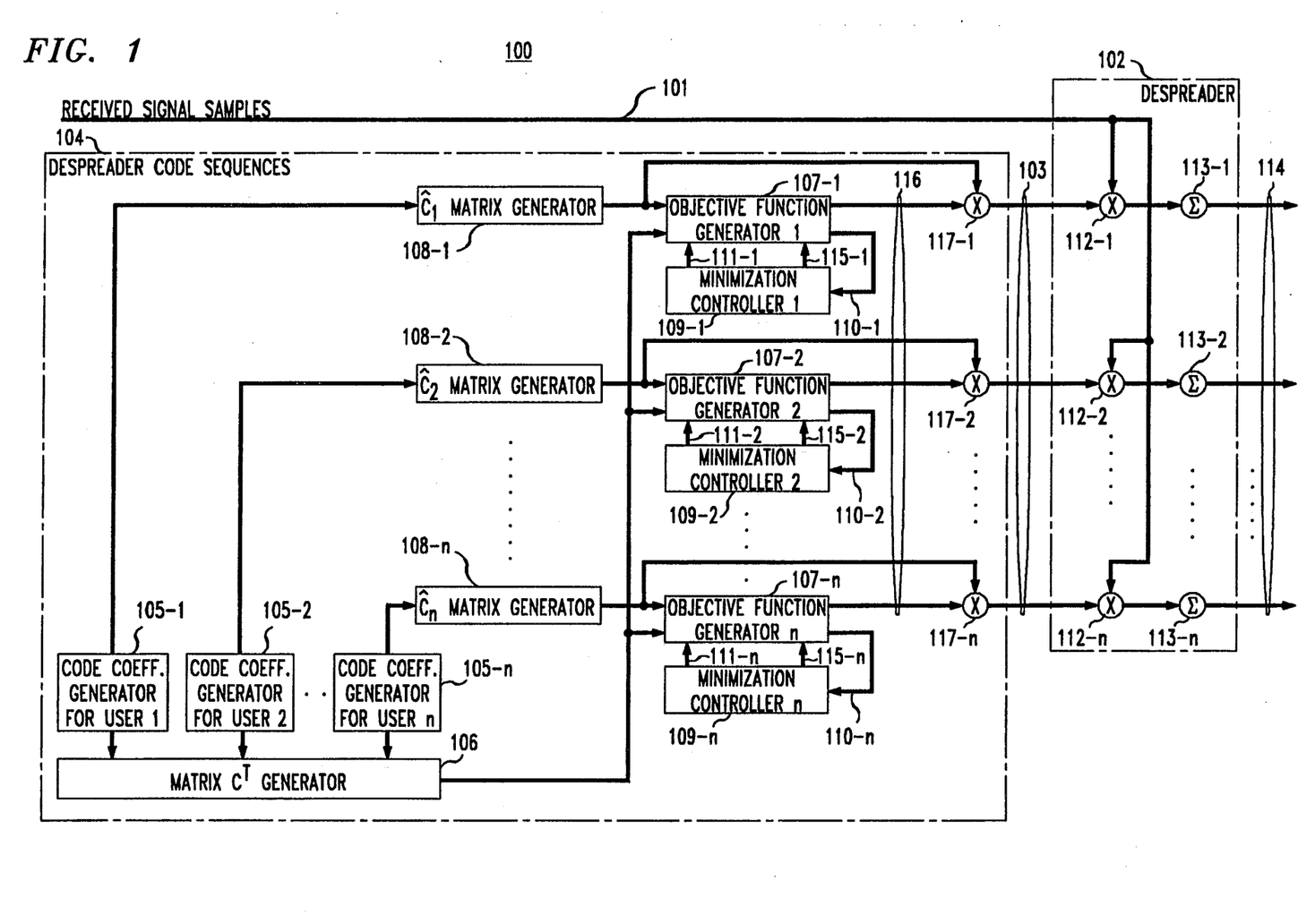
FIG. 1 is a block-schematic diagram of receiver circuitry in accordance with alternative embodiments of the present invention for nondifferentially encoded CDMA systems.

Refer now to FIG. 1 which shows an illustrative receiver 100 which incorporates the present invention. It will be assumed that sampling apparatus (not shown) forms m samples of the received signal in each symbol interval on lead 101. These samples are coupled to despreader 102 which multiplies each sample by a different code coefficient in one of n different code sequences. Each of these code sequences is coupled to the despreader via an associated lead of bus 103.

Code sequences generator 104 provides the n code sequences to despreader 102. A replica of each of the code sequences used by each of the n users in his or her transmitter is provided by code sequence generators 105-1 through 105-n. The outputs of all of these generators is provided to matrix generator 106 which forms the matrix $C^T$ which, in turn, is coupled to objective function generators 107-1 through 107-n. Each of the outputs of code sequence generators 105-1 through 105-n is also respectively coupled to matrix generators 108-1 through 108-n. Each of these generators provides the diagonal matrix associated with a particular code sequence. That is, code sequence generator 105-2 provides the code sequence used by user 2 and matrix generator 108-2 provides the associated diagonal matrix $\hat{C}_2$ containing the code sequence for user 2 distributed across the diagonal of the matrix and having zero values elsewhere. The diagonal matrices provided by generators 108-1 through 108-n are respectively coupled to an associated one of objective function generators 107-1 through 107-n. Each objective function generator 107-1 through 107-n respectively performs a predetermined process to optimize the objective function for users 1 through n. The predetermined process can be any of a variety of well-known optimization techniques, such as forming the mathematical derivative of the objective function and setting this derivative to zero, or by means of an iterative process. In either case, the objective function for each user is governed by either equation (10) or (11) and, with the use of an iterative optimization process, more than one estimate of $w_i$ will be provided to each objective function generator. To accommodate this, objective function generators 107-1 through 107-n are respectively associated with minimization controllers 109-1 through 109-n. Each minimization controller receives the different values of J and the corresponding values of $w_i$ provided by its associated objective function generator during a predetermined portion of each symbol interval. These values are provided to each minimization controller via an associated one of buses 110-1 through 110-n. The minimization controller, utilizing any one of a variety of well-known optimization techniques, forms the next $w_i$ vector and couples this vector to the associated objective function generator via an associated one of buses 111-1 through 111-n. Once per symbol interval, each minimization controller selects the minimum value of J coupled to it and instructs the associated objective function generator to output the vector $w_i$ corresponding to the minimum value of J to bus 116. This instruction is provided via a control signal on bus 115. Accordingly, bus 116 couples the n different $w_i$ vectors to multipliers 117-1 through 117-n in each symbol interval. These multipliers respectively form the products $\hat{C}_1 w_1, \hat{C}_2 w_2, \ldots, \hat{C}_n w_n$, which are coupled via bus 103 to despreader 102.

Despreader 102 includes multipliers 112-1 through 112-n which are respectively connected to summer 113-1 through 113-n. Each multiplier performs a different one of the n multiplications and provides the n products to an associated one of summers 113-1 through 113-n. Each summer outputs the sum of these n products, expressible as $yc'_i$, each symbol interval.

Figure 2:
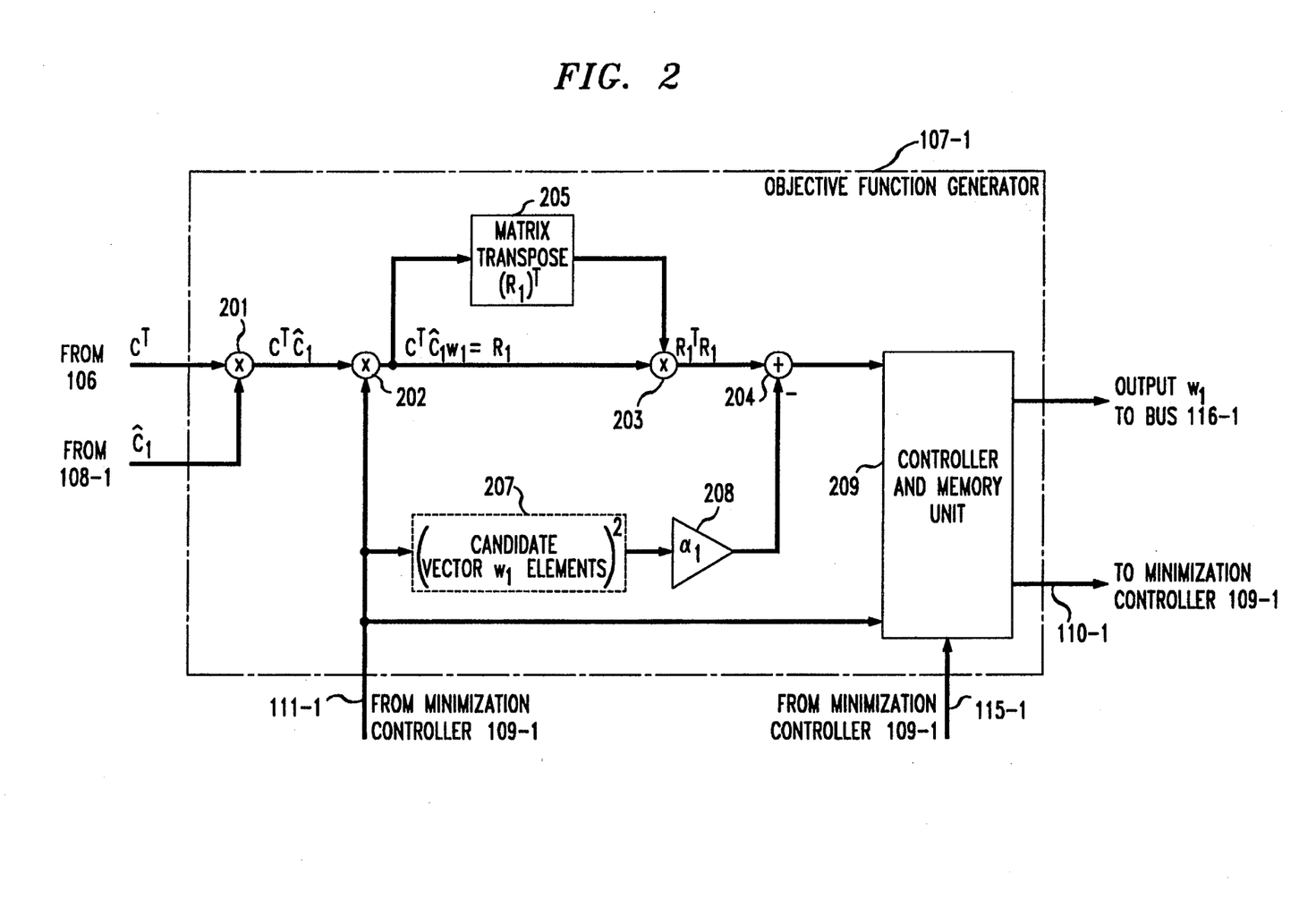
FIG. 2 is a block-schematic diagram of each of the objective function generators in FIG. 1.

FIG. 2 shows the circuitry within one embodiment of the objective function generator 107-1 in FIG. 1 wherein the objective function of either equation (10) or (11) is provided by a predetermined one of a variety of well-known optimization techniques. The circuitry in each of the other objective function generators is identical to that shown in FIG. 2.

As depicted in FIG. 2, multiplier 201 forms the product $C^T \hat{C}_1$ and couples this product to multiplier 202. Multiplier 202 forms the vector $R_1$ or the product of the output of multiplier 201 and each candidate or trial weighting vector $w_1$ provided via bus 111-1. Bus 111-1 provides at least one candidate weighting vectors $w_1$ within each symbol interval. Matrix transposer 205 forms the transpose of the matrix product $C^T \hat{C}_1 w_1$ each symbol interval. Multiplier 203 forms the vector product $R_1^T R_1$ for each candidate vector.

Objective function generator 107-1 can operate in accordance with either equation (10) or (11). In the former case, each candidate vector provided by the minimization controller 109-1 on bus 111-1 is directly coupled to amplifier 208 which multiplies each candidate vector by a predetermined scalar designated as $\alpha_1$. In the latter case, each candidate vector is coupled to circuitry 207 which squares each component of each candidate vector and thence couples these squared components to amplifier 208. Consequently, the use of circuitry 207 is optional and is shown in FIG. 2 as a dotted rectangle. In either case, summer 204 algebraically subtracts the output of multiplier 208 from the output of multiplier 203 to form the objective function J. Controller and memory unit 209 receives each candidate vector and the associated objective function which utilizes this candidate weighting vector and stores these values. The plurality of formed objective functions J in each symbol interval are successively coupled to minimization controller 109-1 via lead 110-1. The minimization controller then selects the minimum value of J formed in each symbol interval and communicates this selection via lead 115 to the controller and memory unit. In response to the control signal on lead 115, the candidate weighting vector corresponding to the minimum value of J is outputted to bus 116.

While the present invention has thus far been described relative to an illustrative CDMA system which employs nondifferential coding, the present invention is also applicable to CDMA systems utilizing differential coding. For differential coding, it can be shown that the objective function set forth in equation (10) becomes $$J = R_i^T R_i - \alpha_i \sum_{L=1}^{m} \hat{w}_{iL} w_{iL}, \quad (13)$$

where the terms in equation (13) have the same meaning as their counterparts in equation (10) and the term $\hat{w}_{iL}$ designates the selected weighting vector for the $i^{th}$ user in the symbol interval immediately preceding the symbol interval for which the optimum weighting vector is being determined. Similarly, the objective function set forth in equation (11) becomes $$J = R_i^T R_i - \alpha_i \sum_{L=1}^{m} |\hat{w}_{iL}| |w_{iL}|. \quad (14)$$

Equations (13) and (14), as with equations (10) and (11), differ only in the constraints on the permissible nonzero value of each component of the vector $w_i$. In equation (13), $0 \leq w_{iL} \leq 1$ and in equation (14) $-1 \leq w_{iL} \leq 1$.

Figure 3:
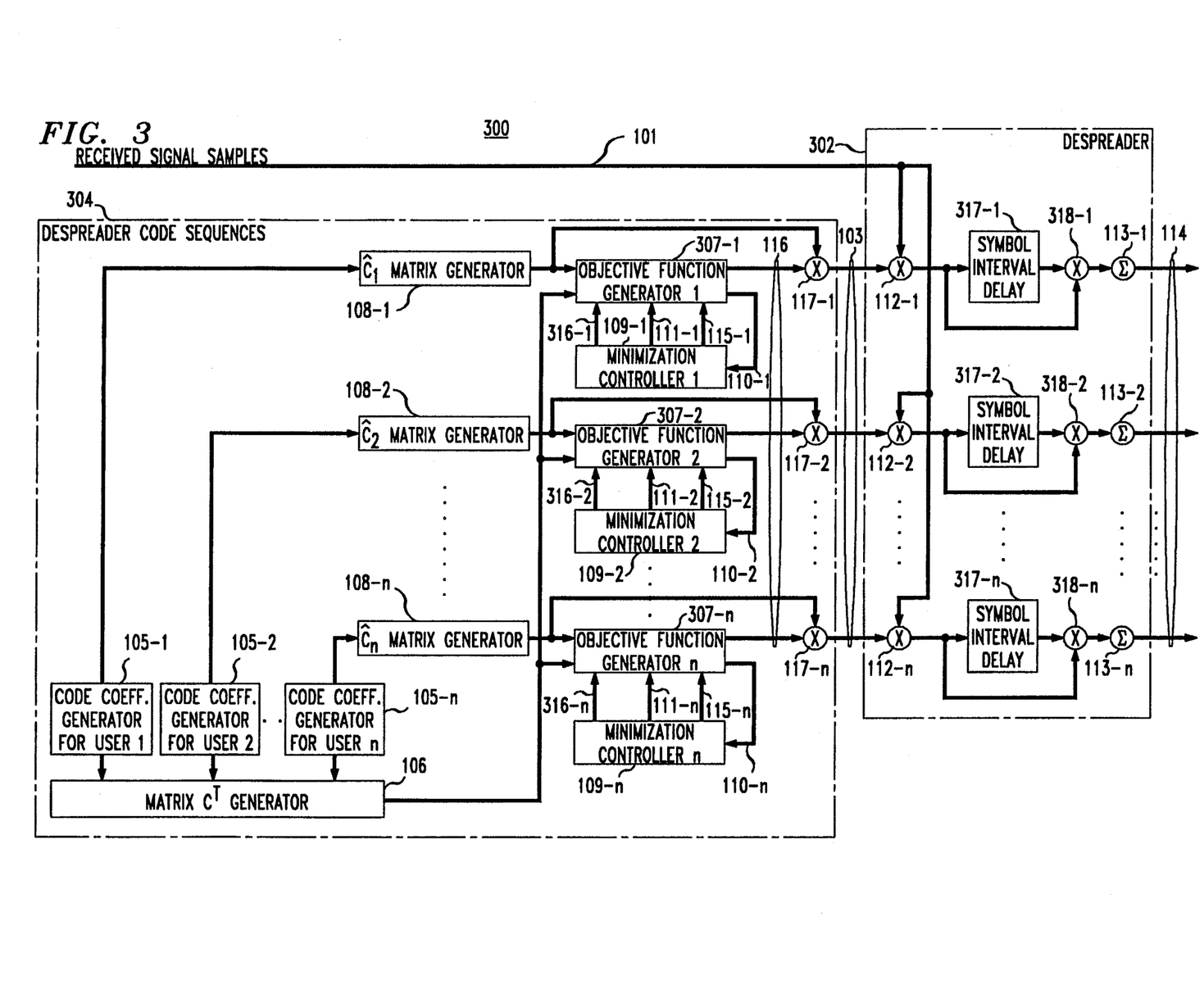
FIG. 3 is a block-schematic diagram of receiver circuitry in accordance with alternative embodiments of the present invention for differentially encoded CDMA systems.

Refer now to FIG. 3. This FIG. shows an illustrative receiver 300 which incorporates the present invention in a CDMA system utilizing differential coding. Much of the circuitry in FIG. 3 is identical in structure and function to that shown in FIG. 1 and each such identical circuitry is designated by the same reference numeral in FIG. 3 as its counterpart in FIG. 1. Indeed, despreader code sequences generator 304 is identical to its counterpart 104 in FIG. 1 except for a modification of each of the objective function generators required to carry out the objective function in accordance with equation (13) or (14). These objective function generators are designated in FIG. 3 by reference numerals 307-1 through 307-n. Since the objective function of equation (13) or (14) requires the vector $\hat{w}_i$, buses 316-1 through 316-n couple this vector between each minimization controller and its associated objective function generator. Similarly, despreader 302 is quite similar to despreader 102 except for the addition of symbol interval delay units 317-1 through 317-n and multipliers 318-1 through 318-n. Each of the former respectively delays the product of a different one of multipliers 112-1 through 112-n by one symbol interval. As a result, multipliers 318-1 through 318-n respectively forms the products of two successive outputs of multipliers 112-1 through 112-n.

Figure 4:
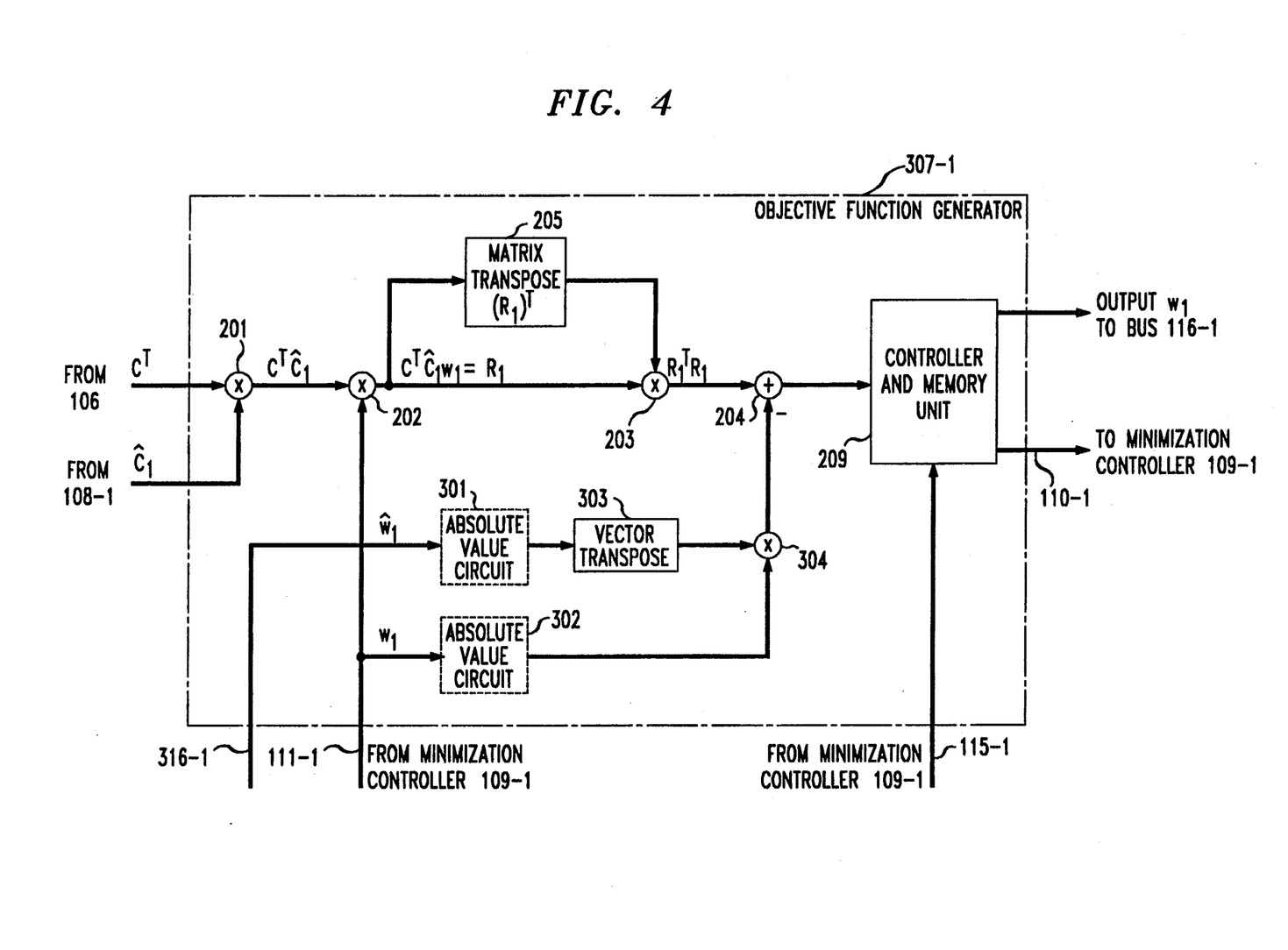
FIG. 4 is a block-schematic diagram of each of the objective function generators in FIG. 3.

Refer now to FIG. 4. As before, the circuitry of the objective function generator for user 1, designated by reference numeral 307-1, has been shown and such circuitry is utilized in each of the objective function generators 307-2 through 307-n. To account for the difference between the objective function set forth in equation (10) and that expressed by equation (13), vector transpose unit 303 and multiplier 304 are utilized. The vectors $\hat{w}_1$ and $w_1$ are respectively supplied via buses 316-1 and 111-1 to objective function generator 307-1. Vector transpose unit 303 forms the vector transpose $\hat{w}_1^T$ which is multiplied by the vector $w_1$ via multiplier 304. If the objective function generator is to implement the objective function governed by equation (14), then absolute value circuits 301 and 302 are disposed as illustrated in FIG. 4 to respectively provide the absolute values of each of the m terms of vectors $\hat{w}_1$ and $w_1$.

Figure 5:
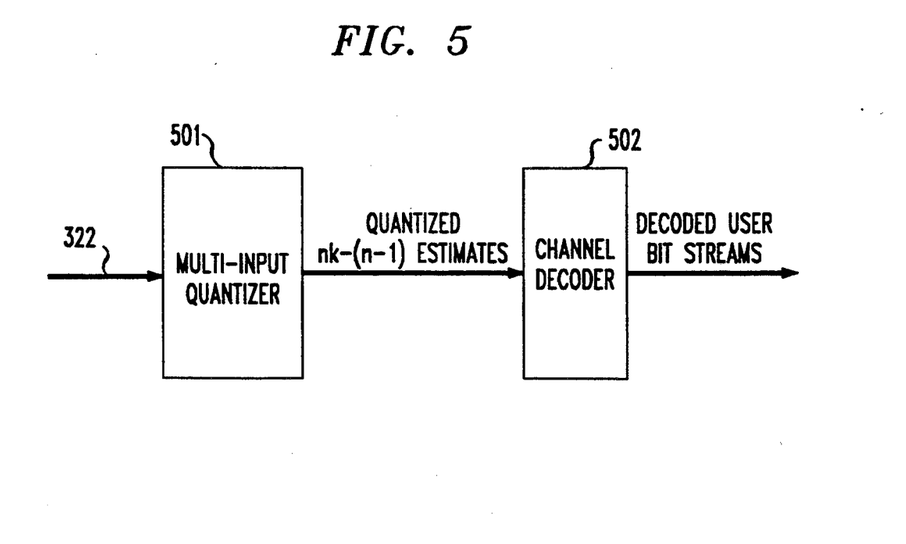
FIGS. 5, 6 and 7 are block-schematic diagrams of alternative additional circuitry which can be used with the circuitry of either FIG. 1 or 3.
Figure 6:
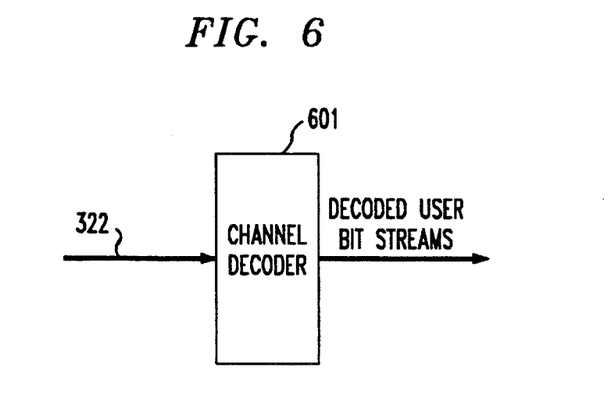
Figure 7:
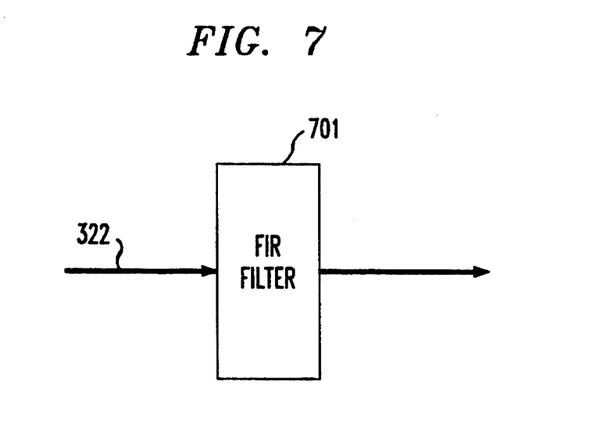

The circuitry in either FIG. 1 or FIG. 3 can be thought of as an estimator and the outputted estimates are real-valued signals. To convert these outputs to binary outputs, the circuitry shown in FIG. 5 or 6 could be coupled to output bus 114. FIG. 5 shows what is commonly referred to as a "hard" decision decoding arrangement including a multi-input quantizer 501 which is serially connected to a channel decoder 502. A "soft" decision decoding arrangement is shown in FIG. 6 and is provided by connecting channel decoder 601 to bus 114. Another use of the circuitry in FIGS. 1 and 3 can be realized by combining either of these FIGS. with FIG. 7. In this regard, it should be noted that the outputs of FIGS. 1 and 3 are representations of the instantaneous power of the received signal. By coupling either one of these outputs to FIR filter 701 shown in FIG. 7, integration of the instantaneous power is provided. Therefore, the combination of FIGS. 1 and 7 or 3 and 7 forms a power estimator.

It should, of course, be noted that while the present invention has been described in terms in reference to illustrative embodiments, other arrangements will be apparent to those of ordinary skill in the art. First, while the disclosed embodiments have been described relative to a CDMA system wherein user symbols, each symbol representative of a plurality of bits, are differentially or nondifferentially coded, the present invention is also applicable to CDMA systems wherein user bits are differentially or nondifferentially coded. Second, while in the disclosed embodiments, the number of received signal samples formed each symbol interval is equal to the number of chips transmitted each symbol interval by each user, the present invention is applicable in arrangements for any number of received signal samples per symbol interval which satisfies the Nyquist theorem. Finally, while the disclosed embodiments utilize discrete devices, the devices can be implemented using one or more appropriately programmed general-purpose processors or special-purpose integrated circuits or digital processors or an analog or hybrid counterpart of any of these devices.

I claim:

1. Apparatus for use in a CDMA system which transmits a coded user signal for each of a plurality of users, each transmitted user signal being formed by processing that user's symbol with an associated sequence of code coefficients, and wherein a received signal includes a composite of all coded user signals, said apparatus comprising     means for receiving samples of said received signal in a predetermined time interval; and means responsive to said received signal samples for forming an estimate of a user symbol in said time interval, said forming means including means for multiplying said received signal samples and a derived sequence of code coefficients, said derived sequence being a function of a correlation of the code coefficient sequence associated with said user and those code coefficient sequences associated with the other users.

2. The apparatus of claim 1 wherein said time interval is one through which said symbol of said user extends.

3. The apparatus of claim 1 wherein said forming means includes means for generating replicas of the code coefficient sequences associated with each of said plurality of users.

4. The apparatus of claim 3 wherein said generating means includes a pseudorandom number generator.

5. The apparatus of claim 1 wherein said derived sequence is derived from a replica of the code coefficient sequence associated with said user.

6. The apparatus of claim 5 wherein said derived code coefficient sequence is formed by multiplying each coefficient in said replica by an associated weighting factor.

7. The apparatus of claim 6 wherein said associated weighting factor varies from coefficient to coefficient in said replica.

8. The apparatus of claim 1 wherein said forming means includes means for generating an objective function associated with said user and means for minimizing said objective function using predetermined criteria.

9. The apparatus of claim 8 wherein said predetermined criteria reduces interference in said symbol of said user.

10. The apparatus of claim 8 wherein said predetermined criteria minimizes loss of received signal energy.

11. The apparatus of claim 1 wherein each coded user signal is nondifferentially coded.

12. The apparatus of claim 1 wherein each coded user signal is differentially coded.

13. The apparatus of claim 1 further including decoding means connected to said forming means for decoding said user symbol estimate.

14. The apparatus of claim 1 further including a serially connected quantizing means and decoding means connected to said foraging means.

15. The apparatus of claim 1 further including filtering means connected to said forming means.

16. A method for use in a CDMA system which transmits a coded user signal for each of a plurality of users, each transmitted user signal being formed by processing that user's symbol with an associated sequence of code coefficients, and wherein a received signal includes a composite of all coded user signals, said method comprising the steps of receiving samples of said received signal in a predetermined time interval; and estimating a symbol of a user in said predetermined time interval in response to said received signal samples, and a derived sequence of code coefficients, said estimating step including a multiplication of said received signal samples and a derived sequence of code coefficients said derived sequence being a function of a correlation of the code coefficient sequence associated with said user and those code coefficient sequences associated with the other users.

* * * * *